US012301532B2

(12) United States Patent
Tamizkar

(10) Patent No.: US 12,301,532 B2
(45) Date of Patent: May 13, 2025

(54) MANAGING AN ESTABLISHMENT OF A COMMUNICATION CONNECTION

(71) Applicant: TELIA COMPANY AB, Solna (SE)

(72) Inventor: Babak Tamizkar, Stockholm (SE)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 18/320,461

(22) Filed: May 19, 2023

(65) Prior Publication Data

US 2023/0379289 A1    Nov. 23, 2023

(30) Foreign Application Priority Data

May 23, 2022   (EP) ..................................... 22174830

(51) Int. Cl.
*H04L 61/103*       (2022.01)
*H04L 61/5007*      (2022.01)
*H04L 61/5038*      (2022.01)

(52) U.S. Cl.
CPC ........ *H04L 61/103* (2013.01); *H04L 61/5007* (2022.05); *H04L 61/5038* (2022.05)

(58) Field of Classification Search
None
See application file for complete search history.

(56) References Cited

U.S. PATENT DOCUMENTS

| 7,293,077 | B1 * | 11/2007 | Teo ........................ H04L 45/36 370/395.54 |
| 7,339,931 | B2 * | 3/2008 | Takihiro .............. H04L 12/1854 370/392 |
| 8,681,661 | B2 * | 3/2014 | Narasimhan ............ H04L 45/74 370/255 |
| 8,738,803 | B2 * | 5/2014 | Onoue .................. H04L 61/103 709/224 |
| 10,142,160 | B1 * | 11/2018 | Adams ..................... H04L 45/66 |
| 2004/0054799 | A1 | 3/2004 | Meier et al. |
| 2005/0074015 | A1 | 4/2005 | Chari et al. |
| 2015/0172156 | A1 * | 6/2015 | Lohiya .................. H04L 61/103 709/224 |
| 2015/0256445 | A1 * | 9/2015 | Pai .......................... H04L 45/66 709/238 |
| 2022/0021610 | A1 * | 1/2022 | Kreger-Stickles .... H04L 61/103 |

FOREIGN PATENT DOCUMENTS

| CN | 114051013 A | * | 2/2022 | |
| CN | 112532526 B | * | 5/2022 | ........... H04L 45/745 |
| GB | 2283645 A | * | 5/1995 | ......... H04L 12/4604 |
| WO | 2011150396 A1 | | 12/2011 | |

OTHER PUBLICATIONS

Search Report for EP22174830, dated Nov. 2, 2022, 2 pages.

* cited by examiner

*Primary Examiner* — Younes Naji
(74) *Attorney, Agent, or Firm* — NIXON & VANDERHYE

(57) ABSTRACT

A method, performed by a routing device including a number of communication interfaces towards a number of subnets, for generating a number of frames to determine a subnet a destination network node resides is provided, the method includes: accepting a frame; generating a successor ARP requests for each communication interface of the routing device; and transmitting generated successor ARP requests over each communication interface to respective subnets. Also a routing device and a computer program are provided to.

21 Claims, 7 Drawing Sheets

MANAGING AN ESTABLISHMENT OF A COMMUNICATION CONNECTION

CROSS-REFERENCE TO RELATED APPLICATIONS

This application claims priority of EP Patent Application No. 22174830.4 filed on May 23, 2022, the entirety of which is here by incorporated herein by reference.

BACKGROUND OF THE INVENTION

Field of the Invention

The invention concerns in general the technical field of a management of a communication network. More particularly, the invention is related to determining a subnet a network node resides.

Description of the Related Art

In broad terms a communication network refers to an implementation in which a plurality of computing devices are communicatively interconnected to each other either directly or indirectly over another computing device(s). Due to variety of reasons the network architecture may comprise so-called sub-net-works, or subnets, in which a number of computing devices are arranged to perform operation for some common purpose, such as implementing a certain service or being dedicated to a certain group of end-users. In other words, the term subnet may refer to a logical division of a computer network. As such, the logical division may be implemented physically, i.e. that the computing devices belonging to a certain subnet are physically located in the same place, or virtually, i.e. the computing devices belonging to a certain subnet are defined to belong to the same subnet virtually and independently their physical location. The computing devices of the subnet may be arranged to be reached by others with so-called broadcasting functionality and in such an environment the subnet may be called as a broadcast domain. Different subnets each comprising a number of computing devices as well as other device, such as switches, may be connected to each other with gateway devices, such as routing devices and similar, which subnets connected together form the communication network.

A management of the communication network is a crucial task in order to maintain the network operative so that end-users may reach services implemented in the communication network. Very common situation in the network management, e.g. in data centers, is that an entity, or entities, implementing a certain service needs to be moved to another subnet. This kind of change re-quires manual configuration which needs to be carefully done so that the moved entity remains reachable by other computing devices.

The reachability of the different computing devices in the communication network applying Internet Protocol (IP) for the communication is arranged by applying so-called address tables maintained in different network entities, such as in the gateways. In the address tables it is defined various pieces of address information which enable the respective entity forward received data frames in a correct manner so as to reach the destination. In other words, when the routing device receives a packet or data frame from a source node, the routing device looks at the Source and Destination IP addresses indicated in the data frame and uses its routing table to find the right direction (i.e., the best path) to forward the frame towards the destination node. The routing device looks up the Destination MAC (Media Access Control) address in its routing table to determine where the data frame needs to be forwarded. All the routing devices do the same until the frame reaches to the destination node. Routing protocols are mechanisms by which routing information is exchanged between routing devices so that routing decisions can be made. There are different routing protocols, but they all are designed for one main purpose, and it is to find the best path.

In order to describe different aspects it is hereby assumed that the subnets correspond to the broadcast domains and by default any broadcast frame remains in the respective subnet. Moreover, each communication interface of routing devices belong to different subnets, i.e. one communication interface is not a part of a plurality of subnets. This also results that all network devices, or network nodes, which are connected to the same interface of the routing device belong to the same sub-network. Still further, each subnet form its own sub-network, i.e. there is no common network part for two subnets.

From a computing device perspective it is originally configured to operate in a first subnet called as original subnet from now on. As a result an IP address of the computing device is based on the original subnet. Moreover, when the computing device is moved to another subnet the receiving subnet is called as a new subnet, or as an outlander subnet. As a result the computing device, such as a server device, may be considered as a floating computing device in the new subnet.

For sake of completeness, the following definitions are made in order to describe aspects in relation to the prior art solutions and to the present invention:

Broadcast frame is a frame with the Destination MAC address field of FF:FF:FF:FF:FF:FF. When a network node sends a broadcast frame, all other network nodes in same BD receives that frame.

Unicast frame is a frame with a specific Destination MAC address belongs to a network node. When a network node sends a unicast frame, only a network node with that MAC address receives that frame.

Still further, as is commonly known so-called Address Resolution Protocol (ARP) is a communication protocol used for finding a Media Access Control (MAC) address given an IP address of a destination computing device when initiating a communication. The MAC address of the destination computing device may already be present in a so-called ARP table maintained by the respective device, such as by a routing device, but in case it is not found from the ARP table, the source computing device of the communication generates so-called ARP Request message in which pre-defined fields are provided with address information available at the moment. A structure of an ARP Request, or ARP frame in general, is shown in the following representation:

| Layer 2 address | | ARP (request) | | | |
|---|---|---|---|---|---|
| Destination MAC address | Source MAC address | Sender MAC address | Sender IP address | Target MAC address | Target IP address |

The sender, i.e. the source computing device, adds its own MAC address into the address structure as well as its own IP address and an IP address of the destination computing device referred as the Target IP address in the representation above. The MAC address of the destination computing device is left blank since it is now known for the time being.

Now, FIG. 1 is referred to which illustrates at least some aspects already discussed in the foregoing description. As a matter of fact FIG. 1 illustrates schematically a starting point for describing further aspects wherein a routing device R0 is communicatively connected to three subnets BD-10, BD-20, and BD-30 over respective interfaces int-1, int-2, and int-3 as denoted in FIG. 1. The first subnet BD-10 comprises two network nodes Node-A and Node-B communicatively connected to a switch SW1 providing a communication channel towards the routing device R0 over the interface int-1. Respectively, the second subnet BD-20 comprises two network nodes Node-C and Node-D communicatively connected to a switch SW2 providing a communication channel towards the routing device R0 over the interface int-2. Still further, the third sub-net BD-30 comprises network node Node-E communicatively connected to a switch SW3 providing a communication channel towards the routing device R0 over the interface int-3. As commonly known and also derivable from FIG. 1 the entities in the subnets BD-10, BD-20, BD-30 are provided with network addressing scheme (cf. e.g. IP addresses as shown in FIG. 1) corresponding to the respective subnet BD-10, BD-20, BD-30. Additionally, the network nodes are provided with unique identifiers called as MAC addresses for use as a network address in communications within a subnet. The interfaces of the routing device R0 towards the respective subnets BD-10, BD-20, BD-30 are provided with the same information. FIG. 1 as well as corresponding further figures as is described in the forthcoming description also disclose an example of network addresses complying with IP addressing scheme as well as MAC addresses of the entities in the communication environment as illustrated in the respective figures. As derivable the communication interfaces of the routing device R0 also their own addresses.

In the above described environment two nodes may communicate with each either so that both communicating nodes reside in the same subnet or so that the communicating nodes reside in different subnets. In other words the situations may be as described in points 1) and 2) below:

1) When the two communicating nodes (source & destination) have the IP addresses in the same subnet, and they are in the same subnet. In this case they are connected to the same interface of the routing device R0 which interface also has the IP in the same subnet with those nodes. It doesn't matter how many switches are between the nodes and the interface of the routing device R0 and/or if they are connected in same switch or not.

As an example, in FIG. 1:
Node-A (Source) is connected to the Int-1 of R0 at BD-10 with the Subnet of 10.0.0.0/24,
Node-B (Destination) is connected to the Int-1 of R0 at BD-10 with the Subnet of 10.0.0.0/24.

2) When the two nodes (source & destination) have the IP addresses in the different subnets. Each of them is placed in its original subnet but two different subnets. In this case they are connected to separate interfaces of the routing device R0. Each node has an IP in the same subnet of the interface of the routing device R0.

As an example, in FIG. 1:
Node-A (Source) is connected to the Int-1 of R0 at BD-10 with the Subnet of 10.0.0.0/24,
Node-C (Destination) is connected to the Int-2 of R0 at BD-20 with the Subnet of 20.0.0.0/24.

In the following an establishment of a communication between the communicating network nodes residing in the same subnet are described step-by-step in the following. It is assumed that the communicating entities are not involved in the communication before which means that the ARP tables of the communicating entities do not have any entries. The communicating entities in the example as described are Node-A and Node-B in the subnet BD-10. The establishment of the communication is achieved as follows:

a. The Node-A (10.0.0.3/24) as a source node wants to send a packet to IP 10.0.0.4/24 (Node-B) as a destination. Because the source and the destination are in the same subnet, the Node-A sends a broadcast ARP request to find out what is the MAC address of a node with IP address of 10.0.0.4. The Node-A needs the MAC address of Node-B to add that as layer two address into the frame.

b. The broadcast ARP request reaches all the nodes that are connected to the routing device R0 int-1 including R0 int-1 (All nodes in BD-10). But only Node-B sends the ARP reply to the Node-A because the ARP request is a request to find out the MAC address of the IP address 10.0.0.4 and the Node-B sees its own IP address inside the ARP request received. Against the ARP request, the ARP reply is a unicast frame because the Node-B knows the MAC address of the sender which is the Node-A.

c. The Node-B updates its own ARP table by mapping an entry of Node-A's IP and its MAC (10.0.0.3<->aa:aa:aa:aa:aa:03).

d. The Node-A receives that unicast ARP reply. The Node-A also updates its own ARP table by mapping an entry of Node-B's IP and its MAC (10.0.0.4<->bb:bb:bb:bb:bb:04).

e. Next, the Node-A generates and sends a new unicast data frame with the Source MAC address of itself and the Node-B's MAC address as Destination MAC address followed by layer three address of the frame including the IP address of the Node-A as the Source IP address and the IP address of the Node-Bas Destination IP address.

f. The Node-B receives this unicast frame as it sees its own MAC and IP address as Destination MAC and IP address field inside the frame.

g. Because the Node-B has the entry in its ARP table for the Node-A, the Node-B can response to the Node-A with a unicast frame as well and the setup is ready for the communication.

Correspondingly, in the case the network nodes reside in different subnets and the communicating entities, such as Node-A and Node-C in FIG. 1, are not involved in the communication before which means that the ARP tables of the communicating entities do not have any entries, the establishment of the communication is achieved as follows:

a. The Node-A as a source with the IP address 10.0.0.3/24 wants to send a frame to the Node-C as destination with the IP address 20.0.0.5/24.

Because the source and the destination are in the different subnets, i.e. the subnets, the Node-A should send the data to its default gateway 10.0.0.1 (R0 int-1). The routing device R0 finds out where the destination subnet is connected to and forwards the frame there.

The Node-A needs the layer two address (MAC address) of its default gateway. But because all ARP tables are empty, the Node-A needs to send a broadcast ARP request to get the MAC address of its default gateway with the IP address 10.0.0.1.

b. The routing device R0 receives the broadcast ARP request and because it sees its own IP address (10.0.0.1) inside the request, it sends its own MAC address to the requester (Node-A) with a unicast ARP reply frame.

The routing device R0 also updates its own ARP table with mapping an entry of Node-A's IP and its MAC (10.0.0.3<->aa:aa:aa:aa:aa:03).

c. The Node-A receives the unicast ARP reply and updates its ARP table with mapping an entry of the routing device R0 int-1 IP and its MAC address (10.0.0.1<->ab:ab:ab:ab:ab:11).
d. The Node-A generates a unicast data frame with the following address information:
  i. Layer two addresses including its own MAC address as the source and MAC address of its default gateway (R0 Int-1) as the destination.
  ii. Layer three addresses including its own IP as the source and the Node-C's IP address as destination.
e. The routing device R0 receives this unicast frame from Int-1. The routing device R0 accepts the frame because it sees its own MAC address as the Destination MAC address field inside the frame.
f. Next, the routing device R0 looks at the layer three address of the frame and it sees 20.0.0.5 which it is not its own IP address. The routing device R0 should forward the frame through the right interface to reach to that address.

Because the Destination IP (20.0.0.5) is an IP in the subnet of 20.0.0.0/24 which is one of the directly connected interface of the routing device R0 (int-2), the routing device R0 knows it should forward the frame through that interface.

But the problem is that the routing device R0 needs MAC address of 20.0.0.5 to use it as layer two address to forward the frame while it doesn't know what the MAC address of the 20.0.0.5 is. Thus, the routing device R0 needs to send an ARP request to get the Node-C's MAC address.

g. The routing device R0 sends a broadcast ARP request through int-2 to see what the MAC address of the IP 20.0.0.5 is. It sends the broadcast ARP request only through int-2 because int-2 and Destination IP address of the frame are in same subnet.
h. All nodes at BD-20 receive that broadcast ARP request but only the Node-C will response to that because it sees its own IP address inside the ARP request packet.
i. The Node-C sends a unicast ARP reply to the routing device R0 with adding its MAC address into that.
j. The Node-C also updates its own ARP table by mapping an entry of the routing device R0 int-2 IP and its MAC (20.0.0.1<->cd:cd:cd:cd:cd:21).
k. The routing device R0 receives that unicast ARP reply with the MAC address of 20.0.0.5, which it is cc:cc:cc:cc:cc:05.
l. First the routing device R0 updates its own ARP table by mapping an entry of Node-C and its MAC (20.0.0.5<->cc:cc:cc:cc:cc:05).
m. Then the routing device R0 forwards the original frame that already received from the Node-A toward the Node-C by setting the MAC address of the Node-C as the Destination MAC address field of the frame. The routing device R0 also sets the Source MAC address of the frame with the MAC address of int-2.

The rest of the fields in the frame remain as it was.
n. The Node-C receives this unicast data frame and accepts it because it sees its own MAC address and IP address inside the frame.

o. Now the Node-C wants to reply to that frame. From the Node-C perspective the Destination IP address is the IP address of the sender of the frame which it is 10.0.0.3/24. But as usual the Node-C needs the layer two MAC address of the destination to be able forward the frame. Because the IP address of the destination node (Node-A) is in a different subnet as the source node (Node-C), the Node-C should forward the frame to its default gateway which is 20.0.0.1.

Again the Node-C needs the layer two address (MAC address) of its default gateway. But this time the Node-C doesn't need to send an ARP request to get the MAC address of its default gateway. It's because the Node-C has already learned that MAC and added that to its ARP table.

As a result, the Node-C generates a new data frame with the Destination IP address of the Node-A (10.0.0.3) and the Source IP address of itself (20.0.0.5).

For the layer two addresses, the routing device R0 adds the MAC address of the default gateway as Destination MAC address (cd:cd:cd:cd:cd:21) and its own MAC address as the Source MAC address (cc:cc:cc:cc:cc:05).

p. The routing device R0 receives this frame and accepts it because it sees its own MAC address inside the frame. But the Destination IP address of the frame is not belonged to the routing device R0. So the routing device R0 should forward the frame to the right direction.

Because the Destination IP address of the frame is part of the subnet of the routing device R0 int-1, the routing device R0 knows where to send out the frame. But the routing device R0 needs the Destination MAC address of the 10.0.0.3. This time the routing device R0 has an entry for that because the routing device R0 has already learned that MAC address and added that to its own ARP table (10.0.0.3<->aa:aa:aa:aa:aa:03).

q. The routing device R0 forwards the original frame that already received from the Node-C toward the Node-A by setting the Destination MAC address field of the frame with the Node-A's MAC address (aa:03) and also Source MAC address of the frame with the MAC address of the int-1 (ab:ab:ab:ab:ab:11).

The rest of the fields in the frame remain as it was.
r. The Node-A receives this unicast frame and accepts it because it sees its own MAC address and IP address inside the frame and the setup is ready for the communication.

The above described situations discussed under the items 1 and 2 cover the most typical situation wherein the communicating nodes reside in their original subnets. As a conclusion of those it may be seen that when a source node and a destination node are in same subnet which it corresponds to that they are in the same subnet and connected to the same interface of the routing device R0, they can directly communicate together with direct ARP request and ARP reply. A further conclusion is that when the source node and the destination node are in different subnets, they must also be connected to separate interfaces of the routing device R0. In this situation, because ARP request is a broadcast frame, it cannot pass through the routing device R0. As a result it is required that ARP requests are performed between source node and the routing device R0 and also between the routing device R0 and the destination node. Hence, for communication the source node sends the data to the routing device R0 and the routing device R0 will send the data to the destination node and vice versa.

As is derivable from above one of the big limitations in networking is that all network nodes connected to the same interface of the routing device R0 must be part of the same subnet with the interface of the routing device R0 to be able to communicate not only with each other but also with the other network nodes in the different network nodes connected to other interfaces of the routing device R0. This becomes very clear in a situation in which a number of network nodes, i.e. one or more, is moved from its original subnet to another subnet while the moved network node keeps, or maintains, the IP address assigned to it in the original subnet. Namely, in such a situation the moved network node gets communicatively completely isolated from the rest of the network nodes in any subnets as is described in the following with some examples. Naturally, it were possible to re-configure the moved network node to operate in the new subnet e.g. by providing a new IP address to it, but it causes a lot of troubles in the data centre environment since the clients provided with a service by the moved network node would lose their connection to the service since the fixed IP address of the service is set to their systems. This naturally causes unsatisfaction by the clients. Another aspect to the challenge of changing the IP address is that in a virtual machine technology commonly applied in the data centre environment one virtual machine (VM) is moved from one physical server to another server while in some cases the destination server may be physically placed at a different subnet. In this case also it is important to keep the IP address of that VM but in order to maintain the accessibility to the VM the only option is to move the VM only to a physical server in the same subnet.

In order to provide further aspects in relation to the drawbacks of the existing situation it is hereby referred to FIG. 2 illustrating schematically a situation in which one network node, here Node-C, is moved from the subnet BD-20 to the subnet BD-10 wherein the Node-C maintains its own IP address. In the following various situations with respect to communicating with the network node Node-C are discussed:

1. Case: The Node-D as a source and the Node-C as a destination want to communicate:
   a. Because logically they are both in same subnet (BD-20), the Node-D sends a broadcast ARP request to see what the MAC address of the Node-C (20.0.0.5) is.
   b. But this ARP request doesn't pass through the routing device R0, and it remains inside the BD-20. Because the Node-C is not placed at BD-20, the Node-D doesn't get any answer and it has to terminate the communication.
2. Case: The Node-C as a source and the node Node-D as a destination want to communicate:
   a. Because they are both logically in same subnet (BD-20), the Node-C sends a broadcast ARP request to see what the MAC address the Node-D (20.0.0.6) is.
   b. But this ARP request doesn't pass through the routing device R0, and it remains inside the BD-10. Because the Node-D is not placed at BD-10, the Node-C doesn't get any answer and it has to terminate the communication.
3. Case: The Node-A as a source and the Node-C as a destination want to communicate:
   a. The Node-A wants to communicate with the Node-C. Because they are logically in different subnets, the Node-A should send the data to its default gateway which is 10.0.0.1.

The Node-A sends an ARP request to get the MAC address of its default gateway and then generates the data frame and sends that to the routing device R0.
   b. The routing device R0 looks at the Destination IP address of the received packet. Since it is 20.0.0.5 in the present example, it belongs to BD-20 connected to the interface int-2 of the routing device R0. The routing device R0 sends an ARP request through the interface int-2 to see what the MAC address of a node with IP 20.0.0.5 is.
   c. Since the Node-C is not anymore placed at the subnet BD-20 connected to int-2, the routing device R0 does not get any ARP reply and it discards the packet.
4. Case: The Node-C as a source and the Node-A as a destination want to communicate:
   a. The Node-C wants to communicate with the Node-A. Because they are logically in different subnets, the Node-A should send the data to its default gateway which it is 20.0.0.1.
   b. The Node-C should send an ARP request to see what the MAC address of the IP 20.0.0.1 is. The routing device R0 receives that ARP request through the interface int-1, but because the Target IP address field of the frame is 20.0.0.1 which is different with the IP address of the interface int-1 (10.0.0.1), the routing device R0 discards the frame. Thus, the Node-C does not get any ARP reply and it has to discard the packet.

As shown with the various case examples the movement of a network node from its original subnet to another subnet by maintaining the original IP address of the network node causes that the moved network node gets isolated from the other nodes both in the same subnet and in the different subnets, and the setup for the communication does not succeed to.

The above described problem arises also in other scenarios which may be briefly described as follows:
   i) The Node-C is moved from its original subnet (BD-20) to an outlander BD like BD-30. Then communication between other nodes in subnets other than the original subnet or the outlander subnet of the moved network node Node-C may then be considered. (See FIG. 3 in which communication is intended between the Node-A and the Node-C.)
   ii) Two nodes like the Node-C and the Node-D are both moved from the same and their original subnet (BD-20) to an outlander other subnet like BD-30. Then the communication between the Node-C and the Node-D may be considered. (See FIG. 4 in which communication is intended between the Node-C and the Node-D both moved to a new subnet.)
   iii) Two nodes from different subnets are both moved to an outlander subnet while that subnet is different with their original subnet. As an example, the Node-C from the subnet BD-20 and the Node-A from the sub-net BD-10 are moved to the subnet BD-30. (See FIG. 5)
   iv) Two nodes from different subnets are moved to different outlander subnets while that subnet of the respective network node is different from its original subnet. As an example, the Node-C from the subnet BD-20 is moved to the subnet BD-30 and the Node-A from the subnet BD-10 is moved to the subnet BD-20. (See FIG. 6)

In view of the above described drawbacks in the existing solutions there is a need to introduce novel approaches which allow communication between network nodes independently to their physical or logical location.

SUMMARY OF THE INVENTION

The following presents a simplified summary in order to provide basic understanding of some aspects of various invention embodiments. The summary is not an extensive overview of the invention. It is neither intended to iden-tify key or critical elements of the invention nor to delineate the scope of the invention. The following summary merely presents some concepts of the invention in a simplified form as a prelude to a more detailed description of exemplifying embodiments of the invention.

An object of the invention is to present a method, a routing device, and a computer program for managing a communication is provided.

The objects of the invention are reached by a method, a routing device, and a computer program as defined by the respective independent claims.

According to a first aspect, a method, performed by a routing device comprising a number of communication interfaces towards a number of subnets, for generating a number of frames to determine a subnet a destination network node resides is provided, the method comprises:
  accepting a frame received from a source network node,
  generating a successor ARP requests for each communication interface of the routing device by setting an IP address field descriptive of a sender in each successor ARP requests to correspond to an IP address of the communication interface of the routing device facing towards the subnet derivable as a destination of the frame and by setting a MAC address fields descriptive of the sender in each successor ARP requests to correspond to a MAC address of the communication interface through which the successor ARP request is intended to be sent out to the subnet, and
  transmitting generated successor ARP requests over each communication interface to respective subnets.

Also a type of the frame may be determined.

The method may further comprise, in response to a determination that the frame is an ARP request:
  updating an ARP table maintained by the routing device by mapping a Sender MAC address, a Sender IP address, and a Reference Interface together and by adding them into the ARP table maintained by the routing device.

In response to the determination that the frame is an ARP request the address field descriptive of the sender in each successor ARP requests set to correspond to the communication interface of the routing device facing towards the subnet derivable as a destination of the frame may be a Sender IP address field.

The communication interface facing towards the subnet derivable as the destination of the frame may be determined based on data in a Target IP address field defined in the frame.

On the other hand, in response to the determination that the frame is a data frame, the address field descriptive of the sender in each successor ARP requests set to correspond to the communication interface of the routing device R0) facing towards the subnet derivable as a destination of the frame may be a Source IP address field. The communication interface facing towards the subnet derivable as the destination of the frame may be determined based on data in a destination IP address field defined in the frame.

According to a second aspect, a routing device comprising a number of communication interfaces towards a number of subnets for generating a number of frames to determine a subnet a destination network node resides is provided, the routing device is configured to:
  accept a frame received from a source network node,
  generate a successor ARP requests for each communication interface of the routing device by setting an IP address field descriptive of a sender in each successor ARP requests to correspond to an IP address of the communication interface of the routing device facing towards the subnet derivable as a destination of the frame and by setting a MAC address fields descriptive of the sender in each successor ARP requests to correspond to a MAC address of the communication interface through which the successor ARP request is intended to be sent out to the subnet, and
  transmit generated successor ARP requests over each communication interface to respective subnets.

The routing device may be configured to determine a type of the frame.

The routing device may further be configured, in response to a determination that the frame is an ARP request, to:
  update an ARP table maintained by the routing device by mapping a Sender MAC address, a Sender IP address, and a Reference Interface together and by adding them into the ARP table maintained by the routing device.

The routing device may be configured to apply a Sender IP address field as the address field descriptive of the sender in each successor ARP requests set to correspond to the communication interface of the routing device facing towards the subnet derivable as a destination of the frame in response to the determination that the frame is an ARP request.

The routing device may further be configured to determine the communication interface facing towards the subnet derivable as the destination of the frame based on data in a target IP address field defined in the frame.

The routing device may also be configured to apply a Source IP address field as the address field descriptive of the sender in each successor ARP requests set to correspond to the communication interface of the routing device facing towards the subnet derivable as a destination of the frame in response to the determination that the frame is a data frame. The routing device may be configured to determine the communication interface facing towards the subnet derivable as the destination of the frame based on data in a destination IP address field defined in the frame.

According to a third aspect, a computer program comprising a computer readable program code configured to cause performing of the method according to any of claims 1 to 7 when the computer readable program code is run on one or more computing apparatuses.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combina-ble unless otherwise explicitly stated. Furthermore, it is to be understood that the use of "a" or "an", i.e. a singular form, throughout this document does not exclude a plurality.

BRIEF DESCRIPTION OF THE DRAWINGS

The embodiments of the invention are illustrated by way of example, and not by way of limitation, in the figures of the accompanying drawings.

DETAILED DESCRIPTION

The specific examples provided in the description given below should not be construed as limiting the scope and/or the applicability of the appended claims. Lists and groups of examples provided in the description given below are not exhaustive unless otherwise explicitly stated.

In the following description on the aspects of the present invention it is used the same references as already used in the context of FIGS. 1-6 as enclosed when discussing about the communication environment into which the present invention may be implemented to. The main references relate to the name of the entities, such as network nodes (cf. Node-A, Node-B, Node-C, Node-D, Node-E), switching devices (cf. SW1, SW2, SW3), a routing device (cf. R0), subnets (cf. BD-10, BD-20, BD-30, a term "subnet"), and interfaces of the routing device R0 (cf. int-1, int-2, int-3). In accordance with at least some embodiments the inventive features of the present solution may be implemented in the routing device R0 and, hence, there is no need to change an operation of any other entities in the communication environment implemented e.g. as a data centre.

As disclosed, the routing device R0 is arranged to interconnect a number of the network nodes residing in a number of subnets, and the aim of the present invention is to allow an establishment of communication connection between the network nodes even if at least one of them is moved from its original subnet to another subnet and an assigned IP address of the network node in the original subnet is maintained. In other words, the moved network node is made communicatively reachable regardless of its physical or logical location in the communication environment.

Figure 7:
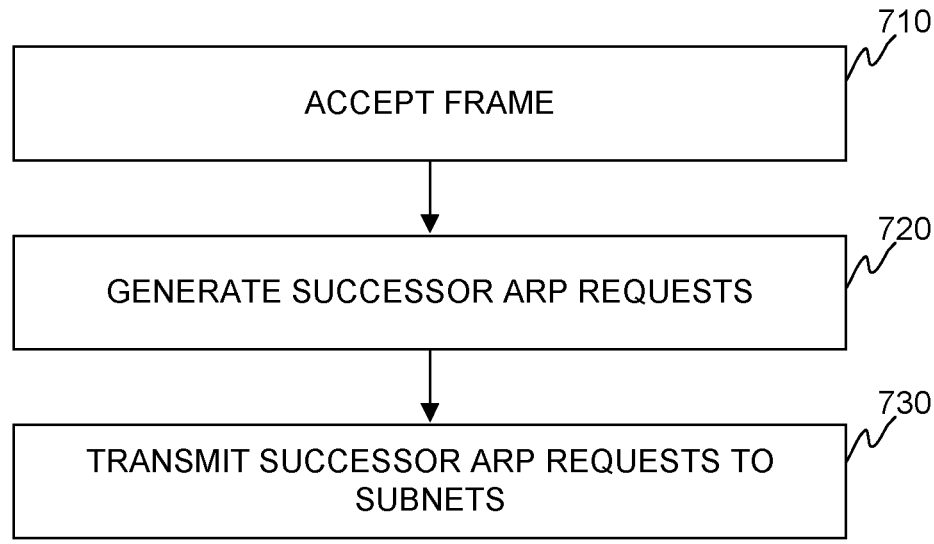
FIG. 7 illustrates schematically a method according to an example.

Next some aspects of the present invention are described by referring to FIG. 7 illustrating schematically a plurality of phases in setting up a communication connection between a source network node and a destination node. FIG. 7 is illustrated from the routing device R0 point of view.

In a first phase the routing device R0 receives a frame from a sender, i.e. from the source network node, and in accordance with a starting point of the method as shown in FIG. 7 accepts 710 it. Since it is a first attempt of the communication it may be assumed that the routing device R0 does not have any preliminary information on the communicating entities. In response to a receipt of the frame the routing device R0 decides if it accepts 710 the received frame or not. The acceptance of the data frame may be dependent on a number of conditions wherein a first condition may be set as to that the received frame is accepted by the routing device R0 if the Destination IP address or the Target IP address of the received broadcast frame equals to an IP address of one of the IP addresses of the interfaces of the routing device R0. Alternatively or in addi-tion, another condition may be set as to that the received data frame is accepted if in a received unicast frame, such as ARP Reply or data frame, the Destination MAC address or the Target MAC address of the frame is equal to the MAC address of the interface of the routing device R0 over which the frame arrives irre-spective to that whether the Destination IP address or the Target IP address of the frame is equal to one of the IP addresses of the interfaces of the routing device R0 or not. The routing device R0 also updates the ARP table maintained by it according to standard procedure upon the acceptance of the frame and as described in the forthcoming description.

For sake of completeness it is worthwhile to mention that the routing device R0 may be configured to determine a type of the received frame e.g. based on a structure of the frame and/or based on data in a header of the frame. The type of the frame may be determined from the layer three information in the frame which has some pre-defined standard fields, and specifically field EtherType, disclosing the type of the frame as is commonly known and utilized. In view of the present invention the types of the frame under interest are either an ARP request or a data frame. The information is needed in the following steps of the method as discussed in the forthcoming description.

Since the routing device R0 does not know a location of the destination node of the frame it is configured to perform an operation to find the destination node. Thus, in response to the accepting 710 of the frame the routing device R0 is configured to generate 720 so-called successor ARP requests for each communication interface of the routing device R0. The successor ARP requests are generated 720 so that an address field descriptive of a sender in each successor ARP requests is set to correspond to the communication interface int-1, int-2, int-3 of the routing device R0 facing towards the subnet BD-10, BD-20, BD-30 derivable as a destination of the frame. In other words, the routing device R0 generates in accordance with the invention a dedicated successor ARP request for each subnet BD-10, BD-20, BD-30 by applying address information of respective communication interfaces int-1, int-2, int-3 of the routing device R0 in a manner that the routing device R0 selects the communication interface int-1, int-2, int-3 corresponding to the one facing the subnet BD-10, BD-20, BD-30 in which the destination of the frame in question is indicated to reside. The destination herein may refer to Target IP address or Destination IP address as is described in the forthcoming description.

Next, the generation 720 of the successor ARP requests is described in more detail in a context of different types of accepted frames, i.e. either the accepted frame is an ARP request or it is a data frame.

As said, the starting point is that the received frame is accepted 710 by the routing device R0 and as a result the routing device R0 is configured to update its ARP table. The update is performed so that a plurality of fields in the ARP table are updated dependently on a type of the accepted frame. In case the accepted frame is an ARP request, or an ARP reply, and there is no entry equal to the Sender IP address field of the arrived frame. Therefore, the routing device R0 is configured to map the following pieces of information obtained from the received frame together: the Sender MAC address, the Sender IP address, and the Reference Interface (Ref. Int.) by adding them as a new entry into the ARP table maintained by the routing device R0. For sake of clarity it is worthwhile to mention that the Ref. Int. corresponds to the interface of the routing device R0 connecting the routing device R0 to the subnet in which the sender of the ARP Request frame or the ARP Reply frame resides. In other words, the Ref Int. corresponds to the interface int-1, int-2, int-3 of the routing device R0 the frame arrived from.

On the other hand, if the accepted frame is a data frame and there is no entry equal to the Source IP address field of the arrived frame, the routing device R0 is configured to map the Source MAC address, the Source IP address, and the Ref. Int. together by adding them as a new entry into its ARP table maintained by the routing device R0. The mentioned pieces of information are obtained from the received frame.

By updating the ARP table with the information available from the time being the routing device R0 is prepared to perform an advantageous phase of the present invention wherein the routing device R0 is arranged to generate 720 a number of new ARP requests called as successor ARP requests as already mentioned. In accordance with the present invention the routing device R0 is configured to generate the successor ARP request individually for each subnet BD-10, BD-20, BD-30 to be transmitted over the respective communication interfaces int-1, int-2, int-3.

In the following it is described some scenario for generating 720 the successor ARP requests from different starting situations originating from a type of the received frame.

In a first possibility, the routing device R0 may detect, in response to an accept of an ARP request, that the Target IP address of the accepted ARP request does not correspond to an IP address of any of the communication interfaces int-1, int-2, int-3 of the routing device R0 and that the routing device R0 does not have an entry for the Target IP address in its ARP table, the routing device R0 may be configured to generate the successor ARP request by obtaining the Target IP address from the received ARP request to determine the sub-net BD-10, BD-20, BD-30 corresponding to that. Then the routing device R0 is configured to determine the communication interface int-1, int-2, int-3 of the sub-net BD-10, BD-20, BD-30 corresponding to the Target IP address of the received and accepted ARP request. In response to the determination of the communication interface int-1, int-2, int-3 the routing device R0 is configured to set the Sender IP address in the successor ARP request to be the same as the IP address of the determined communication interface int-1, int-2, int-3 of the routing device R0. The outcome of generating the successor ARP request in the described manner is that by doing so it is possible to guarantee that the destination node may receive the successor ARP request with a Source IP address in the same subnet BD-10, BD-20, BD-30 with the destination and also the destination can send the ARP reply to that Source IP address and the routing device R0 receives it.

Each successor ARP request are further generated so that both the Source MAC address field and the Sender MAC address field, i.e. the MAC address fields descriptive of the sender, in each successor ARP request frame are set to the MAC address of the respective communication interface int-1, int-2, int-3 through which the respective frame is intended to be sent out to the subnet BD-10, BD-20, BD-30. As a result, it is possible to guarantee that the destination node is able to send the ARP reply back to the routing device R0 and the routing device R0 can receive it as already mentioned.

For sake of completeness it is worthwhile to mention that the routing device R0 may also be configured to set the other fields of the Successor ARP requests the same as in the original ARP request received by the routing device R0. The other fields include the Destination MAC address, the Target MAC address, the Target IP address, among the other known fields in the ARP request.

It is also worthwhile to mention that the reason for sending the generated successor ARP request frame to the communication interface int-1, int-2, int-3 from which it the original ARP request was received is that it may have happened that both the source node and the destination node with the same original subnet BD-10, BD-20, BD-30 are placed in an outlander subnet, i.e. away from their original subnet BD-10, BD-20, BD-30. Even in such a situation they are still able to communicate together with no help of the routing device R0, but the routing device R0 needs to update its ARP table for the place of each network node. In other words, the routing device R0 shall be ready for any other queries that may come later and not just for the pending communication. The same applies to a situation in which two communicating network nodes from different subnets BD-10, BD-20, BD-30 are moved to the same outlander subnet BD-10, BD-20, BD-30. Also for such a situation the routing device R0 shall locate the current network node for each node by applying the mechanism as described.

For sake of clarity, it is worthwhile to mention that the routing device R0 is configured to generate the individual copies of the successor ARP request for each of the communication interfaces it has in the manner as described above when the accepted frame is an ARP request.

On the other hand, if the routing device R0 detects that the received frame is a data frame and accepts 710 it and updates the ARP table according to standard procedure, and detects that the Destination IP address of the frame is not equal to any IP address of the interfaces int-1, int-2, int-3 of the routing device R0, and routing device R0 does not have any entry for that Destination IP address inside its ARP table, the routing device R0 may be configured to generate 720 the successor ARP request by first detecting, from the received and accepted frame, the subnet BD-10, BD-20, BD-30 corresponding to the Destination/Target IP address defined in the received frame. In response to the detection the routing device R0 is configured to determine the communication interface int-1, int-2, int-3 having the IP address of the same subnet BD-10, BD-20, BD-30 as the Destination IP address of the arrived frame. In response to the determination of the interface int-1, int-2, int-3 the routing device R0 is configured to set the Source IP address of the Successor ARP request to be the same as the IP address of the determined communication interface int-1, int-2, int-3 of the routing device R0. Again, the routing device R0 is configured to generate 720 individual successor ARP requests separately so that the Source MAC address field and the Sender MAC address field of each successor ARP frame, i.e. the MAC address fields descriptive of the sender, are set to the MAC address of the respective communication interface int-1, int-2, int-3 through which the respective frame is intended to be sent out to the subnet BD-10, BD-20, BD-30.

The other fields of the successor ARP requests may be set the same as follows:

Destination MAC address: "ff:ff:ff:ff:ff:ff"
Target MAC address: "00:00:00:00:00:00"
Target IP address: the same as the Destination IP address of the arrived data frame.

For sake of clarity it is worthwhile to mention that the latter case as described in the two previous paragraphs is applicable for a situation in which a source node has an entry for the MAC address of a destination node (which it is pointing to the routing device R0), but for any reason routing device R0 does not have any entry for that destination in its ARP table. In this case also the routing device R0 needs to find the MAC address of the destination node and also locate the subnet of the node in question.

Again for sake of clarity, it is worthwhile to mention that the routing device R0 is configured to generate the individual copies of the successor ARP request for each of the communication interfaces it has in the manner as described above when the accepted frame is a data frame.

Figure 3:
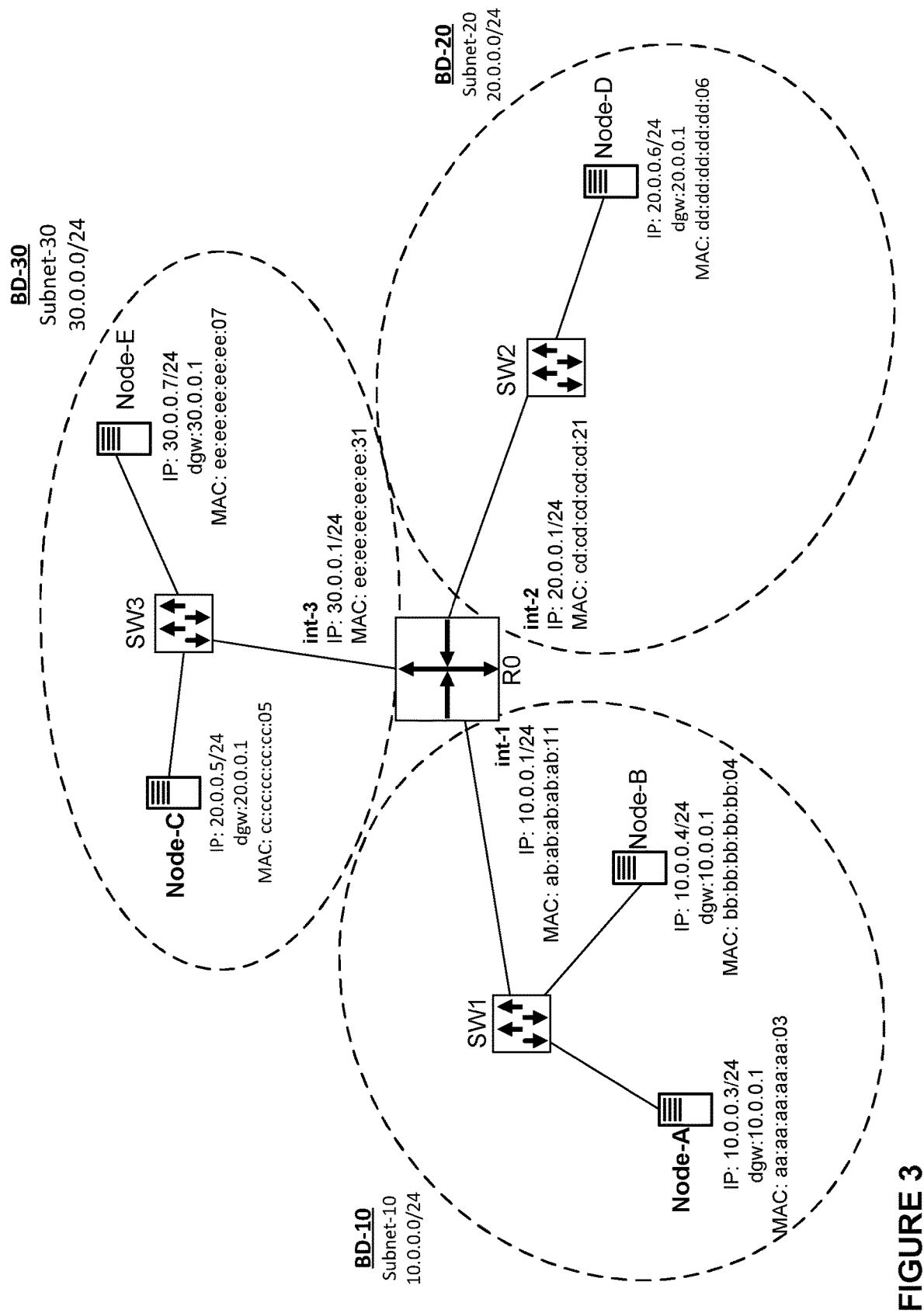
Figure 4:
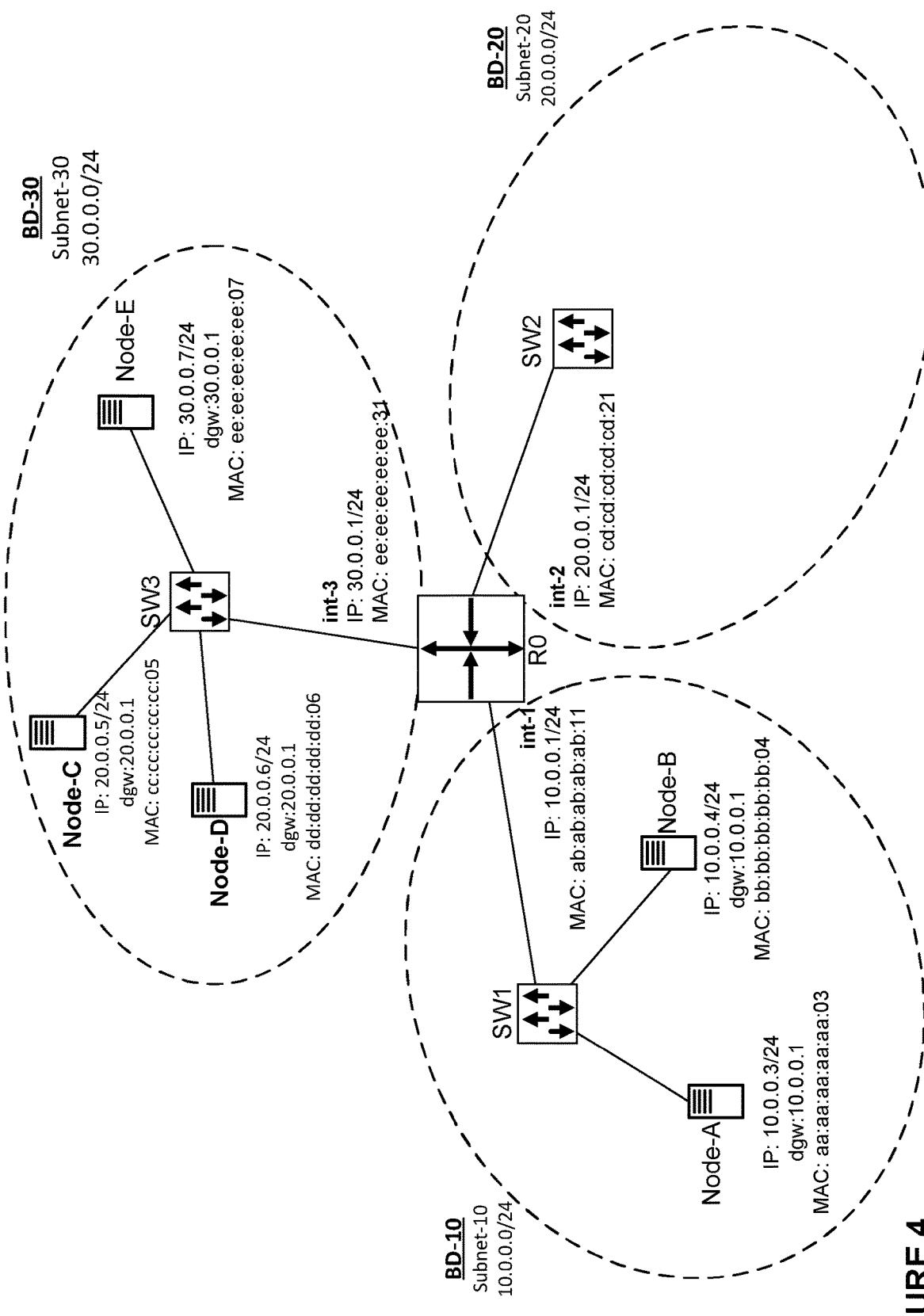
Figure 5:
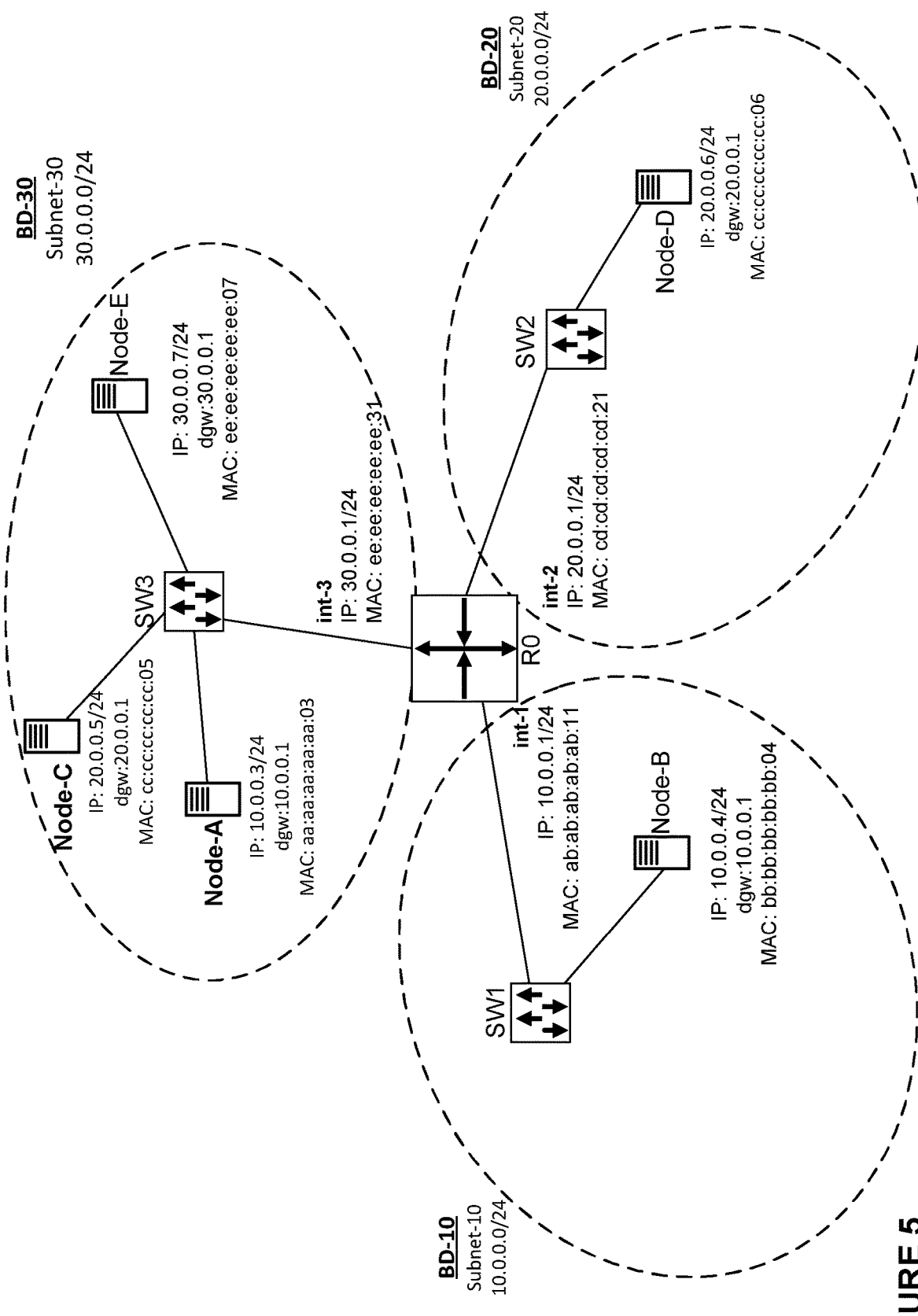
Figure 6:
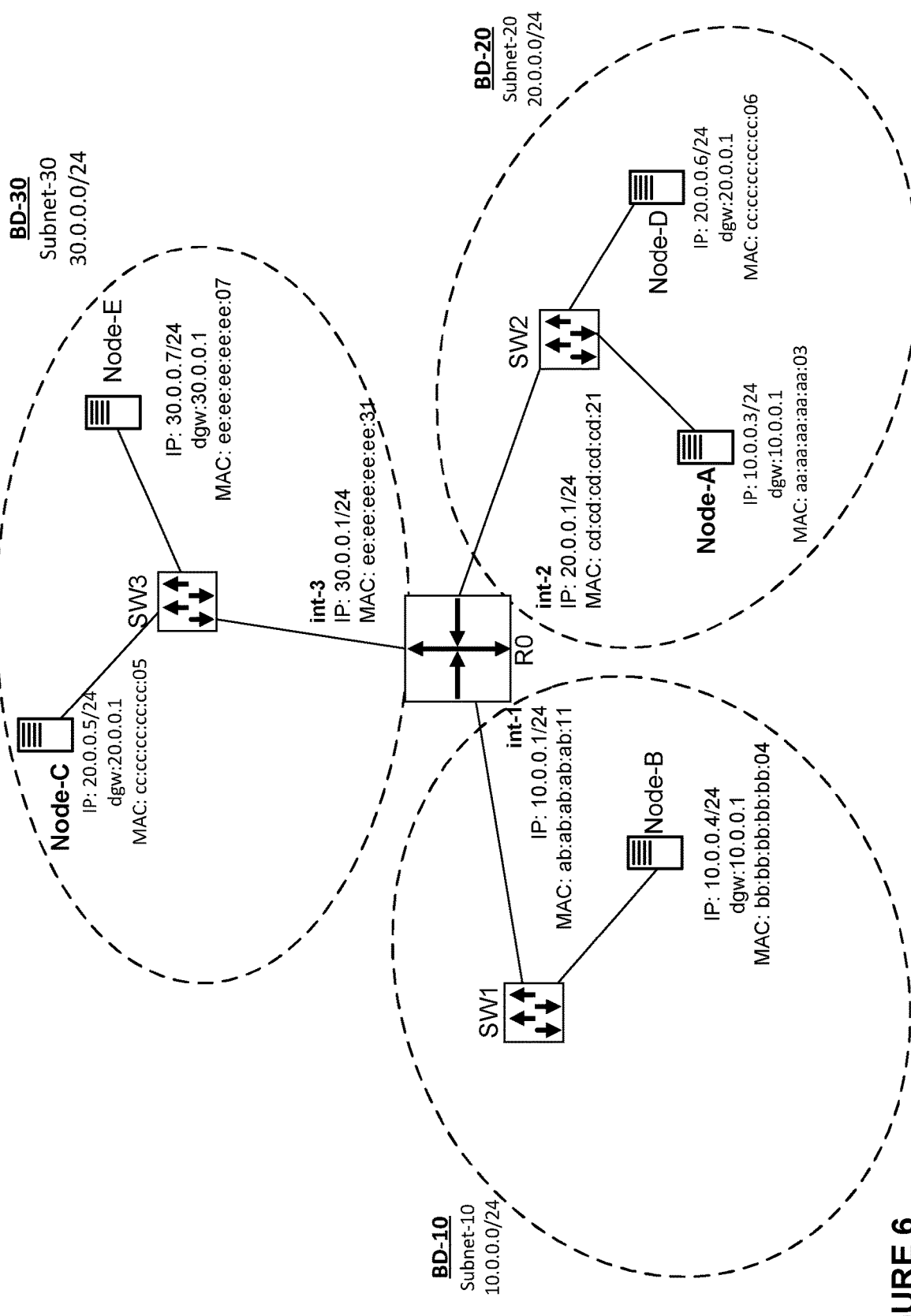

In accordance with the invention the routing device R0 is configured to transmit 730 the generated successor ARP requests over each communication interface int-1, int-2, int-3 to the respective subnets BD-10, BD-20, BD-30 as shown in FIG. 3. As mentioned, the generation of the successor ARP requests is performed individually for each subnet BD-10, BD-20, BD-30 to broadcast the in the respective subnets BD-10, BD-20, BD-30 when transmitted to the subnets BD-10, BD-20, BD-30 over the communication interfaces int-1, int-2, int-3.

In the following it is discussed further aspects in relation to the method as shown in FIG. 7 in order to describe at least in part a consequence of the transmit 730 of the successor ARP request in the manner as described in the foregoing description.

According to some examples, in response to the delivery of the generated 720 successor ARP requests to the respective subnets BD-10, BD-20, BD-30 the routing device R0 may receive an ARP reply from a network node which detected that the successor ARP request is directed to it. The received ARP reply from the network node in question is called as original ARP reply herein for clarity reasons. In other words, the original ARP reply is generated in response to either an original ARP request or the Successor ARP request by the network node. In accordance with some embodiments the routing device R0 is configured to modify the received original ARP reply received from the respective network node to generate a successor ARP reply. The modification of the original ARP reply relates to a modification of address fields of the original ARP reply in a manner as described in the forthcoming description. Namely, in case the routing device R0 detects that the arrived frame is the original ARP reply as described the routing device R0 is configured to modify the arrived ARP reply by setting the Destination MAC address field and the Target MAC address field in the successor ARP reply frame with the MAC address of the Sender MAC address field of the original ARP request frame. Further, the routing device R0 is configured to set the Source MAC address field and the Sender MAC address field in the Successor ARP reply frame with the MAC address of the Reference Interface (Ref. Int) that is mapped in the ARP table of the routing device R0 to the Sender IP address field of the original ARP request. The Reference Interface corresponds to the communication interface of the routing device R0 through which the original ARP request was received. In other words, the respective interface is directly connected to the network node that generated the original ARP request. Still further, the routing device R0 is configured to set the Target IP address field of the Successor ARP reply frame to the Sender IP address field of the original ARP request and maintain the Sender IP address field of the Successor ARP reply frame with no change i.e. as the same as the Sender IP address field of the original ARP Reply frame. In response to the modification of the original ARP reply in the described manner to generate the successor ARP reply, the routing device R0 is configured to send the Successor ARP reply frame through the Ref. Int that is mapped in the ARP table of the routing device R0 to the recipient defined by the Sender IP address field in the original ARP request.

On the other hand, if the received original frame is detected to be a data frame by the routing device R0, it is configured to perform the modification of the address fields as described in the following. First, the routing device R0 is configured to set the Destination MAC address of the new frame, i.e. in the modified frame, to correspond to the MAC address in the ARP table which is mapped to the Destination IP address of the arrived data frame. Additionally, the routing device R0 is configured to set the Source MAC address of the new modified frame to correspond to the MAC address of the Ref. Int that is mapped to the Destination IP address field of the arrived frame. The Source IP address and the Destination IP address of the new modified frame remain with no change i.e. the same as the Source IP address and the Destination IP address of the arrived data frame. In response to the modification of the arrived data frame the routing device R0 is configured to send the successor ARP reply over the communication interface defined by the Ref. Int data.

For sake of completeness it is worthwhile to mention a situation in which a network node initiating the communication is moved from its original subnet BD-10, BD-20, BD-30 to a new subnet BD-10, BD-20, BD-30. Such a situation is e.g. shown in FIG. 5. In such a situation the routing device R0 faces a situation in which the Sender IP address does not correspond to the communication interface int-1, int-2, int-3 of the routing device R0 though which the frame arrives. This kind of situation may be described so that the network node in question and the interface int-1, int-2, int-3 of the routing device R0 are in the same physical subnet BD-10, BD-20, BD-30, but in different logical subnets. In such a case when the routing device R0 sends the ARP reply it is arranged to set the Sender IP address of the ARP reply to correspond to the communication interface int-1, int-2, int-3 of the routing device R0 corresponding to the subnet BD-10, BD-20, BD-30 of the Sender IP address of the original ARP request. Additionally, the routing device R0 is configured to set the Source and Sender MAC address fields to correspond to the MAC address of the communication interface int-1, int-2, int-3 of the routing device R0 through which the original ARP request arrived. Other fields in the ARP reply are set according to the standard procedure of replying to the ARP request.

Figure 1:
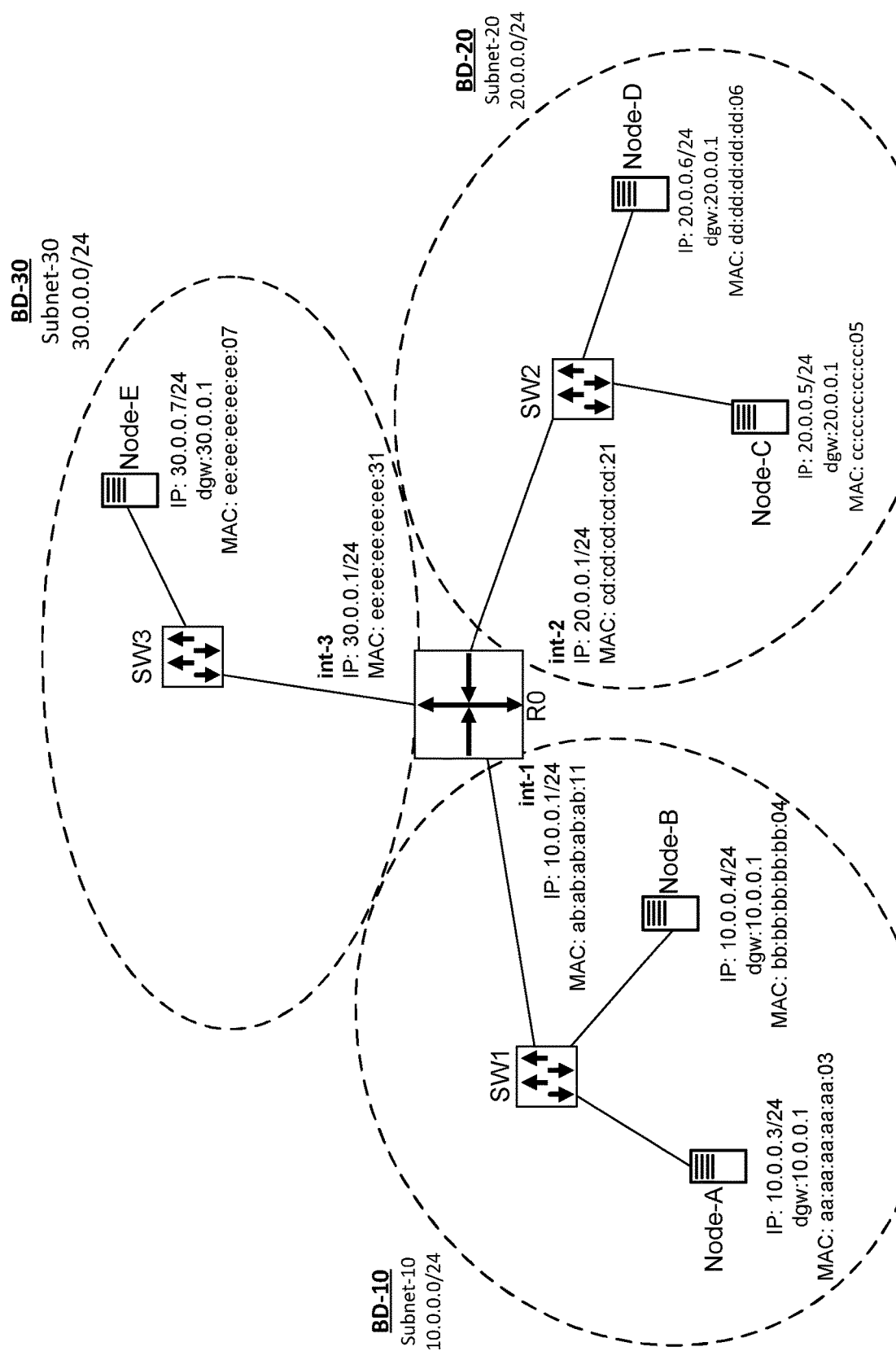
FIGS. 1-6 illustrate schematically various scenarios for communication according to examples.
Figure 2:
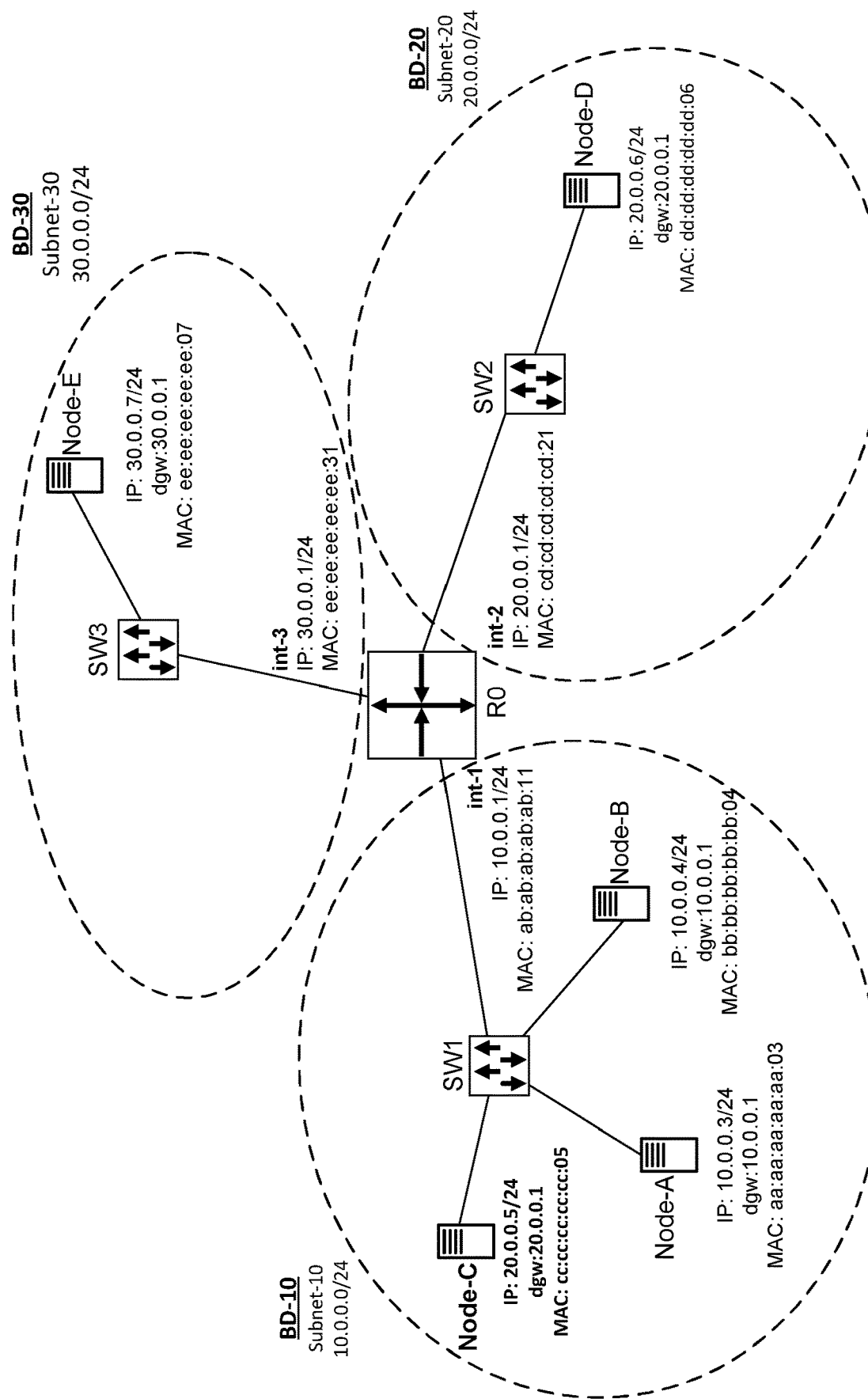

In the following at least some aspects of the invention as described in the foregoing description are applied to in some situations in which at least one of the communicating entities, nodes, is moved from the original subnet to another subnet thus making the network node to be as an outlander network node in the respective subnet. The situation is when a network node (cf. Node-C) is moved from its original subnet (BD-20) to another subnet (BD-10) and the communication between the Node-C and a node in the original subnet BD-20 is studied wherein the communicating node in the original subnet may be the Node-D. In other words, the situation as shown in FIG. 2 is studied when the present invention is applied in the communication therein. The process according to such an example complies with the following procedure:

1) Node-D wants to communicate with Node-C and because the IP address of both network nodes are in same subnet, the Node-D sends a broadcast ARP request to find out what is the MAC address of the node with IP address of 20.0.0.5.

The generated original ARP request sent by the Node-D is the following:

| Layer 2 address | | ARP (request) | | | |
|---|---|---|---|---|---|
| Destination MAC address | Source MAC address | Sender MAC address | Sender IP address | Target MAC address | Target IP address |
| ff:ff:ff:ff:ff:ff | dd:dd:dd:dd:dd:06 | dd:dd:dd:dd:dd:06 | 20.0.0.6 | 00:00:00:00:00:00 | 20.0.0.5 |

Because the broadcast ARP request is something that remains inside a subnet, the Node-C cannot receive it by definition and thus is incapable of replying to the ARP request since the Node-C is now reside at subnet BD-10.

However, also the routing device R0 configured to implement the solution according to the invention receives the broadcast ARP request and accepts 710 it.

2) In response to the acceptance 710 of the frame the routing device is configured to update 720 the ARP table maintained by it with the following pieces of information:

| Ref. int | IP address | MAC address |
|---|---|---|
| Int-2 | 20.0.0.6 | dd:dd:dd:dd:dd:06 |

In other words, the routing device R0 links the Sender MAC address, the Sender IP address, and the Reference Interface (Ref. Int.) together and adds them to the ARP table as described.

3) The routing device R0 is configured to generate 720 copies of the successor ARP request individually to be sent out to the subnets BD-10, BD-20, BD-30. As already described in the foregoing description the generation of the successor ARP requests in performed individually for each of the subnets and by applying the rules as described the successor ARP requests per each of the subnets carry address data as shown in the following tables:

Successor ARP request for sending out to BD-10:

| Layer 2 address | | ARP (request) | | | |
|---|---|---|---|---|---|
| Destination MAC address | Source MAC address | Sender MAC address | Sender IP address | Target MAC address | Target IP address |
| ff:ff:ff:ff:ff:ff | ab:ab:ab:ab:ab:11 | ab:ab:ab:ab:ab:11 | 20.0.0.1 | 00:00:00:00:00:00 | 20.0.0.5 |

Successor ARP request for sending out to BD-20:

| Layer 2 address | | ARP (request) | | | |
|---|---|---|---|---|---|
| Destination MAC address | Source MAC address | Sender MAC address | Sender IP address | Target MAC address | Target IP address |
| ff:ff:ff:ff:ff:ff | cd:cd:cd:cd:cd:21 | cd:cd:cd:cd:cd:21 | 20.0.0.1 | 00:00:00:00:00:00 | 20.0.0.5 |

Successor ARP request for sending out to BD-30:

| Layer 2 address | | ARP (request) | | | |
|---|---|---|---|---|---|
| Destination MAC address | Source MAC address | Sender MAC address | Sender IP address | Target MAC address | Target IP address |
| ff:ff:ff:ff:ff:ff | ef:ef:ef:ef:ef:31 | ef:ef:ef:ef:ef:31 | 20.0.0.1 | 00:00:00:00:00:00 | 20.0.0.5 |

4) In response to a transmit 730 of the generated ARP requests to the respective subnets BD-10, BD-20, BD-30 the Node-C receives the successor ARP generated for the subnet BD-10 as a normal ARP request and accepts it because its own IP address 20.0.0.5 is present in the Target IP field in the received ARP request. In response to this the Node-C updates its ARP table with the entry for ab:ab:ab:ab:ab:11 and 20.0.0.1 as a sender information. Thus, the ARP table in the Node-C is as follows:

| IP address | MAC address |
|---|---|
| 20.0.0.1 | ab:ab:ab:ab:ab:11 |

5) Upon an update of the ARP table the Node-C is configured to send a unicast ARP reply to the routing device R0 over the communication interface int-1. The original ARP reply received by the routing device R0 is as follows:

| Layer 2 address | | ARP (reply) | | | |
|---|---|---|---|---|---|
| Destination MAC address | Source MAC address | Sender MAC address | Sender IP address | Target MAC address | Target IP address |
| ab:ab:ab:ab:ab:11 | cc:cc:cc:cc:cc:05 | cc:cc:cc:cc:cc:05 | 20.0.0.5 | ab:ab:ab:ab:ab:11 | 20.0.0.1 |

6) In response to a receipt of the unicast ARP reply frame as shown above the routing device R0 accepts the frame due to that the Destination MAC address and/or Target MAC address of the frame is equal with the MAC address of the communication interface of the routing device R0.

7) The acceptance of the unicast ARP reply frame causes the routing device R0 to update its own ARP table by adding the Sender MAC address, the Sender IP address and the Ref. Int to the ARP table as follows:

| Ref. int | IP address | MAC address |
|---|---|---|
| Int-2 | 20.0.0.6 | dd:dd:dd:dd:dd:06 |
| Int-1 | 20.0.0.5 | cc:cc:cc:cc:cc:05 |

In other words, since the frame is an ARP reply and there is no entry equal to the Sender IP address field the update is done accordingly.

8) In response to the update of the ARP table maintained by the routing device R0 it is configured to generate and send a successor ARP reply through the communication interface int-2 to the Node-D since the frame the routing device R0 received from the Node-C was the original ARP reply.

The generated successor ARP reply corresponds to:

| Layer 2 address | | ARP (reply) | | | |
|---|---|---|---|---|---|
| Destination MAC address | Source MAC address | Sender MAC address | Sender IP address | Target MAC address | Target IP address |
| dd:dd:dd:dd:dd:06 | cd:cd:cd:cd:cd:21 | cd:cd:cd:cd:cd:21 | 20.0.0.5 | dd:dd:dd:dd:dd:06 | 20.0.0.6 |

9) The Node-D receives the successor ARP reply as a normal ARP reply that it was waiting for. Due to the operation of the routing device R0 between the communicating nodes the Node-D interprets that the ARP reply comes from the Node-C even if it is actually coming from the Node-D, i.e. it is generated by the Node-D.

Hence, the Node-D updates its ARP table by mapping the MAC address of cd:cd:cd:cd:cd:21 to the IP address of Node-C (20.0.0.5) as shown in the following table:

| IP address | MAC address |
|---|---|
| 20.0.0.5 | cd:cd:cd:cd:cd21 |

10) Next, the Node-D generates the data frame to be sent out to the Node-C. The Node-D interprets cd:cd:cd:cd:cd:21 as the MAC address of the Node-C while this actually is the MAC address of the communication interface int-2 of the routing device R0. Thus, the generated data frame by the Node-D is the following:

| Layer 2 address | | Layer 3 address | | |
|---|---|---|---|---|
| Destination MAC address | Source MAC address | Source IP address | Destination IP address | Payload |
| cd:cd:cd:cd:cd:21 | dd:dd:dd:dd:dd:06 | 20.0.0.6 | 20.0.0.5 | |

11) The routing device R0 receives the unicast data frame and performs as follows:

a) The routing device R0 accepts the frame.

b) Since the Source IP address of the received data frame already exists in the ARP table of the routing device R0, the routing device R0 does not perform any updates in the ARP table in that regard.

c) The routing device R0 does not either send a successor ARP reply because the routing device R0 has an entry for the Destination IP address in its ARP table.

d) The routing device R0 forwards a modified data frame, as shown below, to the Node-C since the received frame is the data frame.

| Layer 2 address | | Layer 3 address | | |
| --- | --- | --- | --- | --- |
| Destination MAC address | Source MAC address | Source IP address | Destination IP address | Payload |
| cc:cc:cc:cc:cc:05 | ab:ab:ab:ab:ab:11 | 20.0.0.6 | 20.0.0.5 | |

12) The Node-C receives the unicast data frame and accepts it as it detects its own MAC address and its own IP address as the destination addresses in the frame.
13) The Node-C is configured to update its ARP table with an entry for ab:ab:ab:ab:ab:11 and 20.0.0.6 as the sender information. As a result the ARP table of the Node-C is as follows:

| IP address | MAC address |
| --- | --- |
| 20.0.0.1 | ab:ab:ab:ab:ab:11 |
| 20.0.0.6 | ab:ab:ab:ab:ab:11 |

14) The communication setup is completed to the extent of describing at least some aspects of the invention and especially to describe the role of the routing device R0 as a mediator entity for establishing the communication connection.

As is directly derivable even if the above given description related to the situation as schematically illustrated in FIG. 2 provides aspects in relation to that situation the operation of the routing device R0 is directly applicable to the other possible situation, such as those schematically illustrated in any of FIGS. 1-6. The invention is fully operative also in the most challenging situation in which the initiator of the communication or even both communicating network nodes area moved from their original subnet BD-10, BD-20, BD-30 to a new subnet BD-10, BD-20, BD-30 and the routing device R0 shall manage such a situation in a manner according to the present invention.

Figure 8:
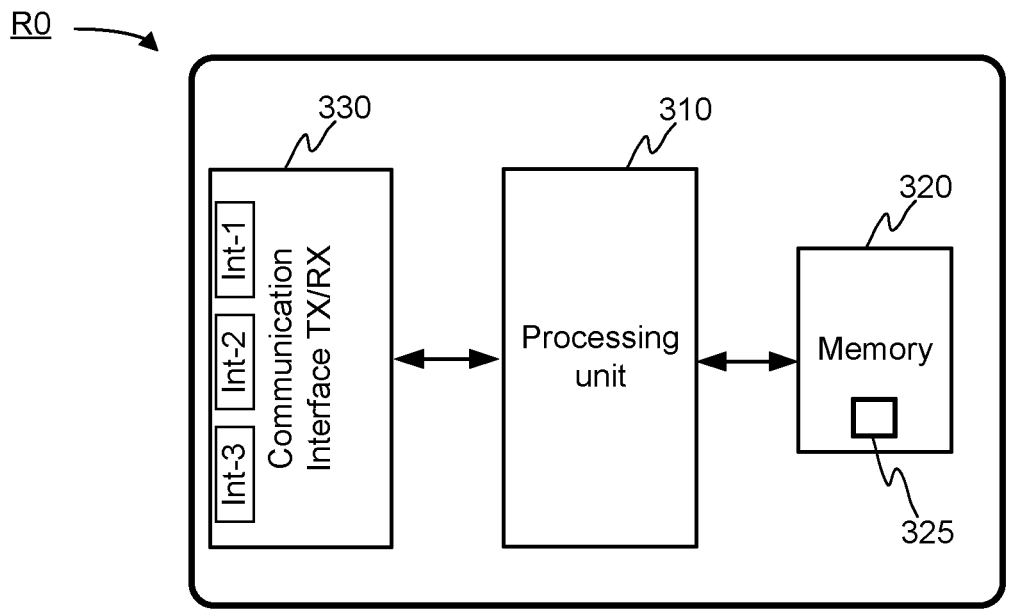
FIG. 8 illustrates schematically an apparatus according to an example.

An example of an apparatus suitable for performing a method according to an example embodiment of the invention as the routing device R0 is schematically illustrated in FIG. 8 as a block diagram. The apparatus may be configured to implement at least part of the method for arranging the routing device R0 to manage an establishment of the communication connection. The execution of the method, or at least some portions of it, may be achieved by arranging a processing unit 310 comprising at least one processor to execute at least some portion of computer program code 325 stored in at least one memory 320 causing the processor 310, and, thus, the apparatus to implement the method steps as described. In other words, the processing unit 310 may be arranged to access the memory 320 and to retrieve and to store any information therefrom and thereto. Moreover, the processing unit 310 may be configured to control a communication through a communication interface unit 330 comprising the communication interfaces int-1, int-2, int-2 of the routing device R0 for accessing the other entities in a manner as described in the foregoing description. Hence, the communication interface unit 330 may be arranged to implement, possibly under control of the processing unit 310, a number of communication protocols, such as an IP or any other communication protocol, for communicating with one or more entities to receive input and to output data as described. The term communication interface 330 shall be understood in a broad manner comprising necessary hardware and software elements for implementing the communication techniques. Further, the apparatus in question may comprise one or more input/output devices for inputting and outputting information. In accordance with the present invention such input/output devices forming a user interface may at least comprise a touch screen, but may also comprise further entities, such as a physical keyboard, buttons, display, loudspeaker, microphone camera and so on. In some implementation of the apparatus at least some of the input/output devices may be external to the apparatus and coupled to it either wirelessly or in a wired manner. For sake of clarity, the processing unit 310 herein refers to any unit or a plurality of units suitable for processing information and control the operation of the apparatus in general at least in part, among other tasks. The mentioned operations may e.g. be implemented with a microcontroller solution with embedded software. Similarly, the invention is not limited to a certain type of memory 320, but any memory unit or a plurality of memory units suitable for storing the described pieces of information, such as portions of computer program code and/or parameters, may be applied in the context of the present invention. Moreover, at least the mentioned entities may be arranged to be at least communicatively coupled to each other with an internal data connection, such as with a data bus. Still further, the routing device R0 may comprise further units, such as sensors and similar e.g. in a case that the routing device R0 is operative to generate data descriptive of its operation.

As derivable from above, some aspects of the present invention may relate to a computer program product which, when executed by at least one processor, cause an apparatus as the routing device R0 to perform at least some portions of the method as described. For example, the computer program product may comprise at least one computer-readable non-transitory medium having the computer program code 325 stored thereon. The computer-readable non-transitory medium may comprise a memory device or a record medium such as a CD-ROM, a DVD, a Blu-ray disc, or another article of manufacture that tangibly embodies the computer program. As another example, the computer program may be provided as a signal configured to reliably transfer the computer program.

Still further, the computer program code 325 may comprise a proprietary ap-plication, such as computer program code for generating the data record in the manner as described.

The computer program code 325 may also be considered to include the definitions and instructions of an execution of the application of the data record in a further use.

The advantage of the invention is that the routing device R0 may perform operations in which a communication connection may be established between communicating nodes even if at least one of the network nodes is moved from its original subnet to which the network node is configured to operate to another subnet.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method, performed by a routing device including a plurality of communication interfaces towards a plurality of subnets, to determine a new subnet in which a destination network node resides in response to the destination network node moving from an original subnet of the plurality of subnets to the new subnet of the plurality of subnets, the destination network node maintaining an Internet Protocol (IP) address assigned to the destination network node in the original subnet, the method comprising:
  accepting a frame received from a source network node;
  generating a successor Address Resolution Protocol (ARP) request for each one of the plurality of communication interfaces of the routing device by setting an IP address field descriptive of a sender in each of the successor ARP requests to correspond to an IP address of the respective communication interface of the routing device facing towards one of the plurality of subnets derivable as a destination of the frame and by setting a Media Access Control (MAC) address field descriptive of the sender in each of the successor ARP requests to correspond to a respective MAC address of each of the respective communication interfaces through which the successor ARP request is intended to be sent out to the subnet derivable as the destination; and
  transmitting the generated successor ARP requests over each of the plurality of communication interfaces to respective subnets to determine the new subnet in which the destination network node resides after the destination network node moves from the original subnet to the new subnet, while maintaining the IP address assigned to the destination network node in the original subnet in the new subnet.

2. The method according to claim 1, wherein a type of the frame is determined.

3. The method according to claim 2, further comprising, in response to a determination that the frame is an ARP request:
  updating an ARP table maintained by the routing device by mapping a Sender MAC address, a Sender IP address, and a Reference Interface together and by adding the Sender MAC address, the Sender IP address, and the Reference Interface into the ARP table maintained by the routing device.

4. The method according to claim 2, wherein, in response to the determination that the frame is an ARP request, the address field descriptive of the sender in each of the successor ARP requests set to correspond to the communication interface of the routing device facing towards the subnet derivable as the destination of the frame is a Sender IP address field.

5. The method according to claim 3, wherein the respective communication interface facing towards the subnet derivable as the destination of the frame is determined based on data in a Target IP address field defined in the frame.

6. The method according to claim 2, wherein, in response to the determination that the frame is a data frame, the address field descriptive of the sender in each of the successor ARP requests set to correspond to the communication interface of the routing device facing towards the subnet derivable as the destination of the frame is a Source IP address field.

7. The method according to claim 6, wherein the respective communication interface facing towards the subnet derivable as the destination of the frame is determined based on data in a destination IP address field defined in the frame.

8. The method according to claim 3, wherein, in response to the determination that the frame is an ARP request, the address field descriptive of the sender in each of the successor ARP requests set to correspond to the respective communication interface of the routing device facing towards the subnet derivable as the destination of the frame is a Sender IP address field.

9. The method according to claim 4, wherein the respective communication interface facing towards the subnet derivable as the destination of the frame is determined based on data in a Target IP address field defined in the frame.

10. The method according to claim 8, wherein the respective communication interface facing towards the subnet derivable as the destination of the frame is determined based on data in a Target IP address field defined in the frame.

11. A routing device comprising:
  a plurality of communication interfaces towards a plurality of subnets configured to generate a plurality of frames to determine a new subnet in which a destination network node resides in response to the destination network node moving from an original subnet of the plurality of subnets to a new subnet of the plurality of subnets, the destination network node maintaining an Internet Protocol (IP) address assigned to the destination network node in the original subnet; and
  at least one processor configured to:
    accept a frame received from a source network node,
    generate a successor Address Resolution Protocol (ARP) request for each one of the plurality of communication interfaces of the routing device by setting an IP address field descriptive of a sender in each of the successor ARP requests to correspond to an IP address of the respective communication interface of the routing device facing towards one of the plurality of subnets derivable as a destination of the frame and by setting a Media Access Control (MAC) address field descriptive of the sender in each of the successor ARP requests to correspond to a respective MAC address of each of the respective communication interfaces through which the successor ARP request is intended to be sent out to the subnet derivable as the destination, and
    transmit the generated successor ARP requests over each of the plurality of communication interfaces to respective subnets to determine the new subnet in which the destination network node resides after the destination network node moves from the original subnet to the new subnet, while maintaining the IP address assigned to the destination network node in the original subnet in the new subnet.

12. The routing device according to claim 11, wherein the at least one processor is configured to determine a type of the frame.

13. The routing device according to claim 12, the at least one processor is further configured, in response to a determination that the frame is an ARP request, to:
  update an ARP table maintained by the routing device by mapping a Sender MAC address, a Sender IP address, and a Reference Interface together and by adding the Sender MAC address, the Sender IP address, and the Reference Interface into the ARP table maintained by the routing device.

14. The routing device according to claim 12, wherein the at least one processor is configured to apply a Sender IP address field as the address field descriptive of the sender in each of the successor ARP requests set to correspond to the respective communication interface of the routing device facing towards the subnet derivable as the destination of the frame in response to the determination that the frame is an ARP request.

15. The routing device according to claim 13, wherein the at least one processor is configured to determine the respective communication interface facing towards the subnet derivable as the destination of the frame based on data in a target IP address field defined in the frame.

16. The routing device according to claim 12, wherein the at least one processor is configured to apply a Source IP address field as the address field descriptive of the sender in each of the successor ARP requests set to correspond to the respective communication interface of the routing device facing towards the subnet derivable as the destination of the frame in response to the determination that the frame is a data frame.

17. The routing device according to claim 16, wherein the at least one processor is configured to determine the respective communication interface facing towards the subnet derivable as the destination of the frame based on data in a destination IP address field defined in the frame.

18. The routing device according to claim 13, wherein the at least one processor is configured to apply a Sender IP address field as the address field descriptive of the sender in each of the successor ARP requests set to correspond to the respective communication interface of the routing device facing towards the subnet derivable as the destination of the frame in response to the determination that the frame is an ARP request.

19. The routing device according to claim 14, wherein the at least one processor is configured to determine the respective communication interface facing towards the subnet derivable as the destination of the frame based on data in a target IP address field defined in the frame.

20. The routing device according to claim 18, wherein the at least one processor is configured to determine the respective communication interface facing towards the subnet derivable as the destination of the frame based on data in a target IP address field defined in the frame.

21. A non-transitory computer-readable medium on which is stored a computer program comprising computer executable program code instructions, the program code instructions being configured when the computer program is executed on a computer, to cause the computer to at least:
  accept a frame received from a source network node;
  generate a successor Address Resolution Protocol (ARP) request for each one of a plurality of communication interfaces towards a plurality of subnets of a routing device by setting an Internet Protocol (IP) address field descriptive of a sender in each of the successor ARP requests to correspond to an IP address of the respective communication interface of the routing device facing towards one of the subnets derivable as a destination of the frame and by setting a Media Access Control (MAC) address field descriptive of the sender in each of the successor ARP requests to correspond to a respective MAC address of each of the respective communication interfaces through which the successor ARP request is intended to be sent out to the subnet derivable as the destination; and
  transmit the generated successor ARP requests over each of the plurality of communication interfaces to respective subnets to determine a new subnet in which a destination network node resides after the destination network node moves from an original subnet of the plurality of subnets to the new subnet of the plurality of subnets, the destination network node maintaining an IP address assigned to the destination network node in the original subnet in the new subnet.

* * * * *